UNITED STATES PATENT OFFICE.

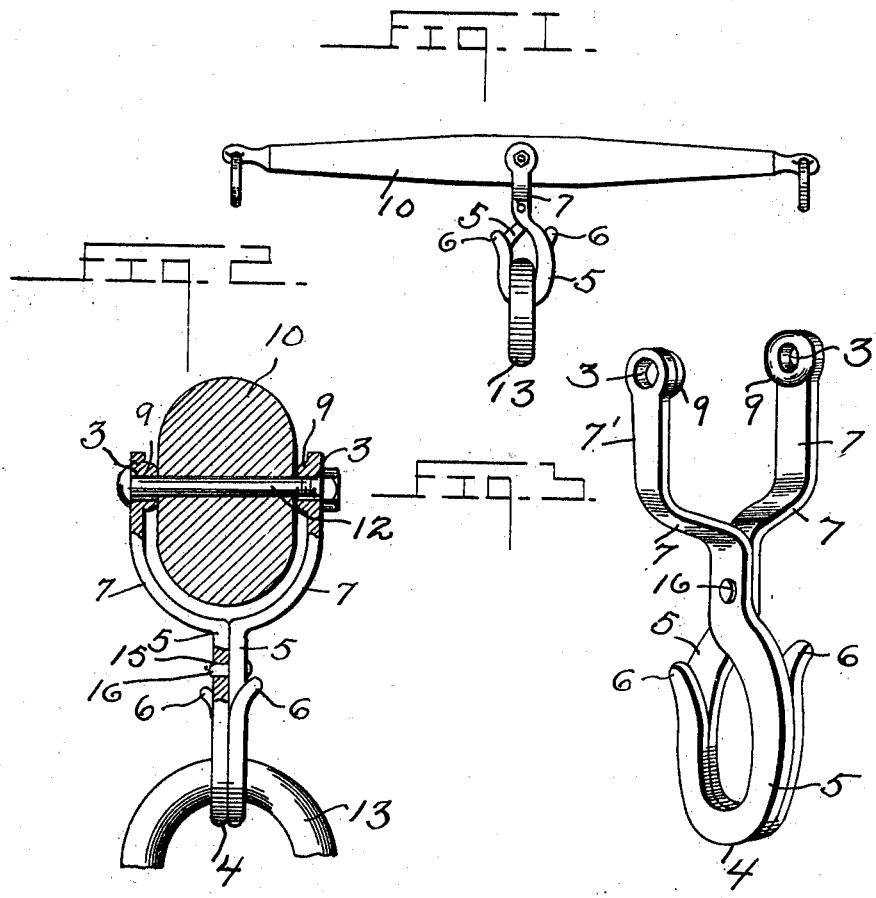
C. WHITE.
NECK YOKE ATTACHMENT.
APPLICATION FILED JULY 15, 1909.
982,556.
Patented Jan. 24, 1911.

CHARLES WHITE, OF SPRAGGS, PENNSYLVANIA.

NECK-YOKE ATTACHMENT.

982,556.      Specification of Letters Patent.      Patented Jan. 24, 1911.

Application filed July 15, 1909. Serial No. 507,710.

*To all whom it may concern:*

Be it known that I, CHARLES WHITE, a citizen of the United States, residing at Spraggs, in the county of Greene and State of Pennsylvania, have invented certain new and useful Improvements in Neck-Yoke Attachments, of which the following is a specification.

This invention has relation to certain new and useful improvements in neck yoke links and attachments.

The object of my invention is to provide a light, neat, simply constructed, readily operated device, whereby a neck yoke may be secured to a wagon tongue.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification and in which like numerals of reference indicate similar parts in the several views, Figure 1 shows a side elevation of a neck yoke embodying my invention. Fig. 2 shows an end view partly in cross section. Fig. 3 shows a perspective view of my device.

In connecting a neck yoke to a wagon tongue, it is highly desirable that the securing means should be readily attachable and positive in its operation. In my present invention, I provide such a securing means, which is further admirably adapted to be used as a whiffle tree fastening means.

In the accompanying drawings, the numeral 5, designates the two similar flat hooked portions, which are arranged to be held in juxtaposition as shown in Fig. 2, each hook end being outwardly directed as shown at 6.

Each hook is continued in a curved portion 7, bent laterally outward and away from the hook end 4, the end having a bolt opening 3, as shown. Each bolt opening is surrounded by a bead 9, quarter round in cross section, arranged to contact with the neck yoke 10.

Passing through the neck yoke and the bolt openings 3, of these hook links, is the bolt 12. This construction insures the hook links being pivotally held to the neck yoke in such a manner that the hooks, which are arranged to normally lie, one upon the other, may be spread to permit the introduction of a suitable ring 13.

At a point marking the base of the hook of one of the members, I provide the pin opening 15, arranged to receive the pin 16, carried by the opposite member, said pin being displaced by pulling the members apart in such manner as to allow said members to swing on their pivot. In Fig. 2 I have disclosed the position of the pin 16, within the socket of the opposite hook link member. By virtue of the beads 9, the hooks are free to move toward and away from one another, so that a ring or link 13 may be readily connected to the hook ended members. The bolt 12 permits a free pivotal movement of the connected hook links while being connected to a wagon tongue.

The connecting means above described is nicely arranged to receive the links of a trace chain so that these hook links may be secured to the end of a whiffle tree.

A neck yoke, or whiffle tree attachment constructed according to my invention, may be readily attached to any neck yoke or whiffle tree as ordinarily used.

And having thus described my said invention, what I claim as new and desire to secure by United States Letters Patent is:

A clip consisting of a pair of hooks bent to embrace a neck yoke, a pin extending through said neck yoke and adapted to enter apertures formed in the end portions of said hooks, said hooks being provided with a beading adapted to engage said yoke, the central portions of said hooks being bent to contact, a pin carried by one of said hooks said pin being adapted to enter an aperture formed in the other hook, the extreme end portion of each hook being bent outwardly out of contact with the other hook.

In testimony whereof I affix my signature, in presence of two witnesses.

CHARLES WHITE.

Witnesses:
   DAISY WHITE,
   N. P. COSGRAY.